US011809965B2

(12) United States Patent
Griffin et al.

(10) Patent No.: US 11,809,965 B2
(45) Date of Patent: Nov. 7, 2023

(54) CONTINUAL LEARNING FOR MULTI MODAL SYSTEMS USING CROWD SOURCING

(71) Applicant: Cisco Technology, Inc., San Jose, CA (US)

(72) Inventors: Keith Griffin, County Galway (IE); Eric Chen, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 1365 days.

(21) Appl. No.: 15/992,013

(22) Filed: May 29, 2018

(65) Prior Publication Data
US 2019/0318198 A1 Oct. 17, 2019

Related U.S. Application Data

(60) Provisional application No. 62/657,307, filed on Apr. 13, 2018.

(51) Int. Cl.
| | |
|---|---|
| *G10L 21/00* | (2013.01) |
| *G10L 25/00* | (2013.01) |
| *G06N 20/00* | (2019.01) |
| *G10L 15/06* | (2013.01) |
| *G10L 15/02* | (2006.01) |

(Continued)

(52) U.S. Cl.
CPC ............ *G06N 20/00* (2019.01); *G06F 18/23* (2023.01); *G06F 18/253* (2023.01); *G06F 18/41* (2023.01); *G06V 10/774* (2022.01); *G06V 10/987* (2022.01); *G10L 15/02* (2013.01); *G10L 15/06* (2013.01); *G10L 15/063* (2013.01); *G10L 2015/0631* (2013.01)

(58) Field of Classification Search
CPC .... G06K 9/6218; G06K 9/6254; G06K 9/629; G06K 9/6256; G06N 20/00; G10L 15/02; G10L 15/06; G10L 15/063; G10L 2015/0631; G06V 10/987
See application file for complete search history.

(56) References Cited

U.S. PATENT DOCUMENTS

| | | |
|---|---|---|
| 9,390,378 B2 | 7/2016 | Garera et al. |
| 10,614,373 B1 * | 4/2020 | Jeffery ..................... G06N 5/04 |

(Continued)

OTHER PUBLICATIONS

Hantke et al., "Introducing the Weighted Trustability Evaluator for Crowdsourcing Exemplified by Speaker Likability Classification," pdfs.semanticscholar.org, pp. 2156-2161.

(Continued)

*Primary Examiner* — Satwant K Singh
(74) *Attorney, Agent, or Firm* — Polsinelli

(57) ABSTRACT

Systems, methods, and devices are disclosed for training a model. Media data is separated into one or more clusters, each cluster based on a feature from a first model. The media data of each cluster is sampled and, based on an analysis of the sampled media data, an accuracy of the media data of each cluster is determined. The accuracy is associated with the feature from the first model. Based on a subset dataset of the media data being outside a threshold accuracy, the subset dataset is automatically forwarded to a crowd source service. Verification of the subset dataset is received from the crowd source service, and the verified subset dataset is added to the first model.

20 Claims, 5 Drawing Sheets

(51) Int. Cl.
*G06F 18/23* (2023.01)
*G06F 18/40* (2023.01)
*G06F 18/25* (2023.01)
*G06V 10/98* (2022.01)
*G06V 10/774* (2022.01)

(56) References Cited

U.S. PATENT DOCUMENTS

| | | | | |
|---|---|---|---|---|
| 10,805,324 | B2* | 10/2020 | Abbaszadeh | G06N 20/00 |
| 10,887,326 | B2* | 1/2021 | Weizman | H04L 63/1441 |
| 11,281,998 | B2* | 3/2022 | Ben-Arie | G06K 9/6218 |
| 2014/0292746 | A1* | 10/2014 | Acharya | G06T 17/00 |
| | | | | 345/419 |
| 2014/0297570 | A1* | 10/2014 | Garera | G06Q 50/01 |
| | | | | 706/12 |
| 2015/0036931 | A1* | 2/2015 | Loui | G06F 16/5854 |
| | | | | 382/195 |
| 2015/0269931 | A1* | 9/2015 | Senior | G10L 15/063 |
| | | | | 704/245 |
| 2016/0034968 | A1* | 2/2016 | Dai | G06F 16/9535 |
| | | | | 705/14.66 |
| 2016/0267425 | A1* | 9/2016 | Li | G06Q 10/0631 |
| 2016/0359697 | A1* | 12/2016 | Scheib | H04L 47/2441 |
| 2017/0011111 | A1* | 1/2017 | Pallath | G06F 16/285 |
| 2017/0018269 | A1* | 1/2017 | Lev | G10L 15/32 |
| 2017/0154314 | A1* | 6/2017 | Mones | G06N 20/00 |
| 2017/0171580 | A1* | 6/2017 | Hirsch | H04W 4/24 |
| 2018/0121555 | A1* | 5/2018 | Li | G06Q 10/10 |
| 2018/0181808 | A1* | 6/2018 | Sridharan | G06K 9/6269 |
| 2019/0180527 | A1* | 6/2019 | Segal | G06N 20/00 |
| 2019/0205794 | A1* | 7/2019 | Hsu | G06N 5/022 |
| 2019/0236511 | A1* | 8/2019 | Xu | G06Q 10/063112 |
| 2019/0294933 | A1* | 9/2019 | Gupta | G06F 18/2433 |
| 2019/0303829 | A1* | 10/2019 | Sheu | G06Q 10/06315 |
| 2019/0378044 | A1* | 12/2019 | Jeffery | G06N 20/00 |

OTHER PUBLICATIONS

Lane, "Community-guided Mobile Phone Sensing Systems," A Thesis submitted to the faculty of Dartmouth College, Jun. 2011, pdfs.semanticscholar.org, pp. i-126.

* cited by examiner

Separate the media data into one or more clusters, each cluster of the one or more clusters based on a feature from a first model.
210

Sample the media data of each cluster and, based on an analysis of the sampled media data, determine an accuracy of the media data of each cluster, the accuracy associated with the feature.
220

Based on a subset dataset of the media data being outside a threshold accuracy, automatically forward the subset dataset to a crowd source service.
230

Receive verification of the subset dataset from the crowd source service.
240

Add the verified subset dataset to the first model.
250

FIG. 2

CONTINUAL LEARNING FOR MULTI MODAL SYSTEMS USING CROWD SOURCING

CROSS REFERECNE TO RELATED APPLICATIONS

This application claims priority to U.S. Provisional Patent Application No. 62/657,307, filed on Apr. 13, 2018, entitled "CONTINUAL LEARNING FOR MULTI MODAL SYSTEMS USING CROWD SOURCING," the content of which is incorporated herein by reference in its entirety.

TECHNICAL FIELD

The present disclosure relates generally to training models, and more specifically to training models using crowd sourcing services.

BACKGROUND

Supervised learning systems such as Webex Assistant, Wakeword and Face Recognition continually require updates to trained models in order to improve accuracy, account for different content, accents, face/skin types, etc. Current best practices are to run a given model for a period of time, collect data, manually label the collected data, create a new model, and test it. If the new model is better than the previous model, the new model is deployed. This, however, takes time and is manually intensive in parts. Optimizing training data selection and manual validation techniques is therefore needed.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 2 is a flow chart illustrating an example embodiment of a training service in accordance with some aspects of the present technology;

DESCRIPTION OF EXAMPLE EMBODIMENTS

Figure 1:
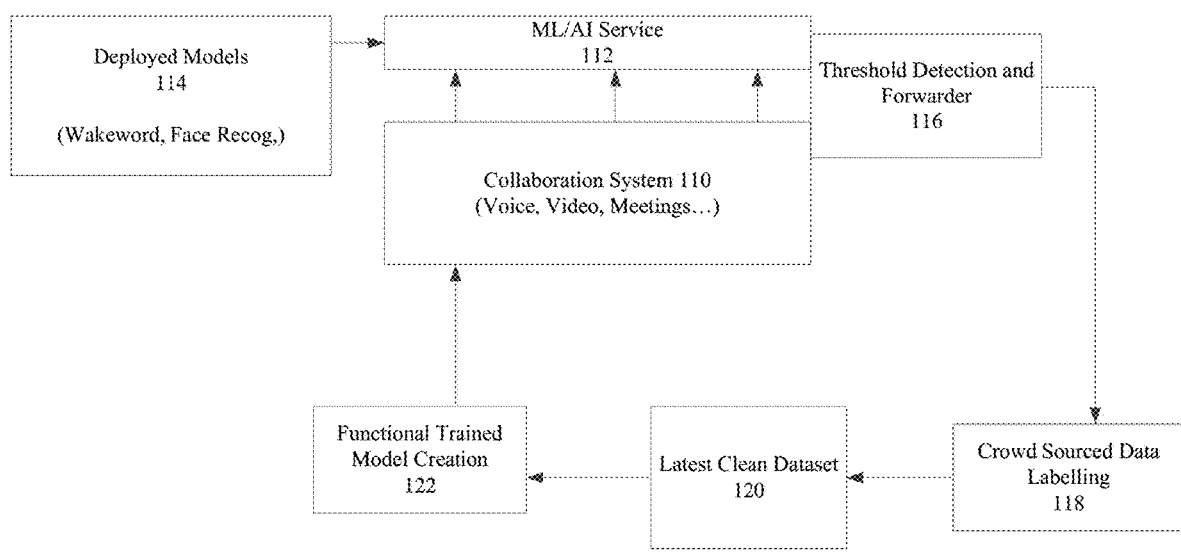
FIG. 1 shows an example training system in accordance with some aspects of the present technology.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

Overview

Systems, methods, and devices are disclosed for training a model. In embodiments, media data is separated into one or more clusters based on a feature from a first model. The media data of each cluster is sampled and, based on an analysis of the sampled media data, an accuracy of the media data of each cluster is determined. The accuracy is associated with the feature from the first model. Based on a subset dataset of the media data being outside a threshold accuracy, the subset dataset is automatically forwarded to a crowd source service. Verification of the subset dataset is received from the crowd source service, and the verified subset dataset is added to the first model.

Example Embodiments

The disclosed technology addresses the need in the art for an automated platform for identifying and optimizing training data selection. Disclosed embodiments allow for the collection of large amounts of data from, for example, cameras and microphones, while spending less time labelling the data. A continuous pipeline of crowdsourcing data is created instead of current batch-oriented approaches that can take weeks or months before being reviewed by someone in house. It does this by separating media datasets into different clusters. Media data can be, but is not limited to, image data, video data, or other media type data. Each cluster is sampled, and the sampled media data that makes up each cluster is labelled to a determined accuracy. When it is determined that the accuracy of the sampled media data for the cluster is outside a certain threshold, the sampled media data is automatically forwarded to a crowdsource service for data verification and labelling. The resulting labelled data is cleaned and returned to the system, where it is then added to the latest clean data set. Newly trained models are generated from this updated data set, and is deployed when it exceeds the accuracy of the previous model.

Current practices involve running a supervised machine learning solution for a period of time to gather media data and determine its accuracy. However, this typically takes a company 2 weeks to a month to review media data with lower accuracies, since the process of reviewing uncertain data is a manual process. The systems and methods disclosed take a manual process and automatically streamlines it to achieve a faster process that creates a trained model for machine learned (ML) models. Taking a wakeword example (a wakeword, such as a word like "Spark", that turns on the system and/or initiates gathering audio data [e.g., media data]), after running for a period of time, all wakewords with an accuracy measured within a range of probabilities, say 70-80% accuracy, are sent to a crowdsourcing vendor as a batch job. The detected audio clips along with the ground truth wakeword transcript ("OK Spark") are sent for analysis and labelling. This would present to a data tester who would be asked to listen to the clip and label the data as a match or not. The resulting dataset is used to train a new, more accurate model.

The proposed solution takes output result data from a collaboration service, such as a subset dataset of the media data, and creates automated data pipelines to a crowd source data labeling and/or correction service as the results occur. Once enough data (set by a threshold data volume) is achieved and/or collected, a new model can be trained and tested.

FIG. 1 shows an example training system in accordance with some aspects of the present technology. Collaboration system 110 takes in media data, such as one or more of media data (e.g., audio data, video data, etc.) from a collaboration service, such as an assistant device, conferencing service, calling service, meeting service, messaging service, etc. While multiple types of media data can be used (such as data relating to wakewords, face recognition, picture, speech to text, etc.), for simplicity the following example embodiments will refer to audio data as making up the media data.

The audio data collected by collaboration system 110 is sent to ML/AI service 112, which can parse the audio data and determine its content (such as through any natural language process or similar) This can be done through one or more deployed models 114 that are applied to the audio data on an automatic basis. Based on deployed models 114, ML/AI service 112 can also determine and assign an accuracy, confidence, or percentile value to the audio data. For example, ML/AI service 112 can assign a 98% accuracy value that an audio file includes a user saying "hey Spark, start a meeting" (meaning there is a 2% uncertainty associated with the audio file).

Some audio files will have a low accuracy value, or a high uncertainty. For example, "Spark" might be a word that triggers a device to wake up from a low power or sleeping state to an active state. Deployed models 114 may accidently translate "hey Spark!" into "hi park!", or vice versa. In these cases, ML/AI service 112 could determine and assign an accuracy value of, say 65-75% certainty to the audio data. For cases where deployed models 112 become uncertain, it is desirable to capture the audio data to improve results from deployed models 114. The audio data can also be clustered with other audio data in ML/AI service 112 according to the accuracy values of the audio data, as well as other features such as speech features (speaker's accent, gender, etc.), type of use case (conferencing, face recognition, etc.), or random sampling. The entire audio dataset or a subset dataset of the clustered audio data can be selected to be forwarded to threshold detection and forwarder service 116.

Threshold detection and forwarder service 116 can take in the subset dataset of audio data analyzed by ML/AI service 112. In some embodiments, threshold detection and forwarder service 116 can receive the subset dataset on a continuous, automated basis. Once the subset dataset that falls outside a threshold accuracy (e.g., below an upper threshold of 76-100% accuracy but above a lower threshold of 0-64% accuracy, for example) reaches a specific volume, the subset dataset is forwarded to crowd sourced data labelling service 118 on a crowd source service. Thus, threshold detection and forwarder service 116 is a threshold detection module which results in outcomes outside of the threshold being automatically forwarded to a crowdsourced data verification and labelling service. The resulting labelled data is then cleaned 120, used to retrain the current models in trained model creation service 122, and then returned to collaboration system 110 where it is added to the dataset of the previous model.

In some embodiments, the newly trained models that are generated from this data is tested for accuracy. When the test exceeds the accuracy of the previous model, the new model can be deployed directly and the process is then repeated on an ongoing basis.

FIG. 2 is a flow chart illustrating an example embodiment of a training service in accordance with some aspects of the present technology. A training method can start by separating media data into one or more clusters, where each cluster is based on a feature from a first model (step 210). The media data of each cluster can be sampled and, based on an analysis of the sampled media data, an accuracy of the media data of each cluster can be determined (step 220). The accuracy can be associated with the feature, such as a speech feature (accent, gender, etc.) or background noise, can be associated with the type of use case (wakeword, face recognition, etc.), or any combination.

The clustering of media data can also include a mechanism to select the most effective media data samples for crowdsourced labelling. Although crowdsourcing is known for its low cost, the cost can still be significant as the media data volume increases in production, even if the media data sent to a crowd source service is narrowed down to a certain threshold range. Eventually the budget would allow only a fraction of the media data to get labelled. Instead of picking a subset dataset through random sampling, unsupervised learning techniques can be used to separate the media data into different clusters and obtain samples from each cluster accordingly. The sampled media data that meets or exceeds a threshold accuracy make up the subset dataset that can be forwarded to the crowd source service. This ensures that minimal but diversified media data samples are used to incrementally update the deployed models. For example, using a wakeword example, each cluster may effectively represent one or more speech features of the model representing a different accent, gender, environmental background noise, etc. The speech feature can also depend on the algorithm used by the deployed models and features input by a user at a user interface.

Figure 3:
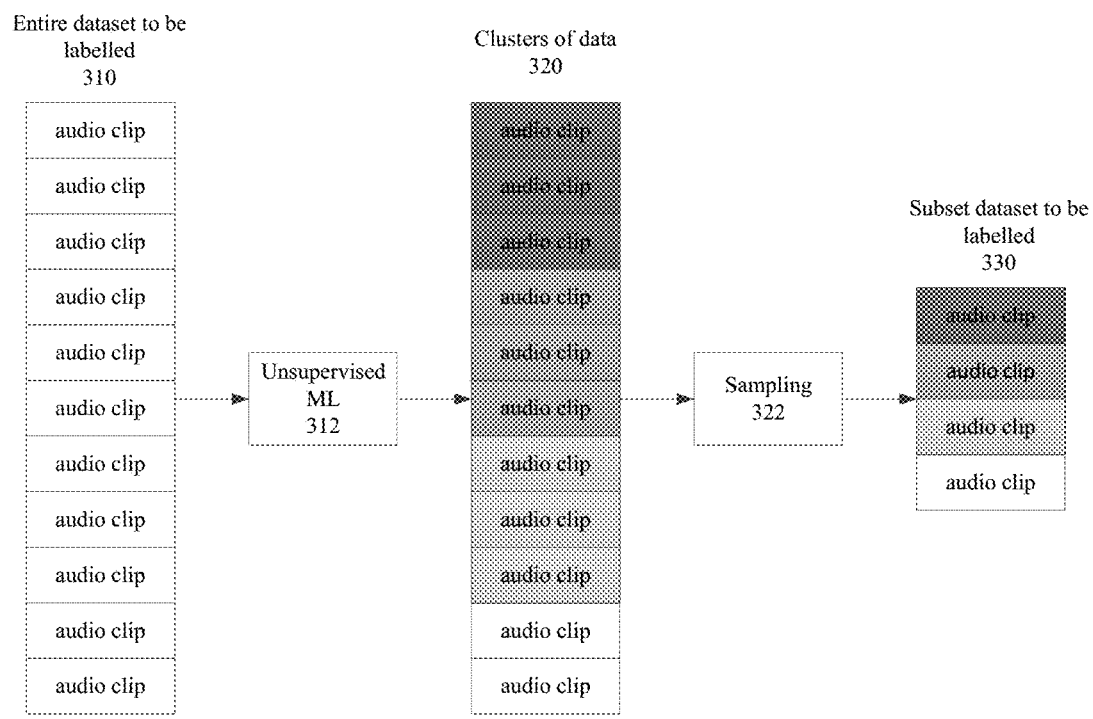
FIG. 3 shows an example clustering system in accordance with some aspects of the present technology.

FIG. 3 shows an example clustering system in accordance with some aspects of the present technology, which shows how audio data from an entire dataset 310 can be separated into one or more clusters of data 320. The entire dataset 310 can include multiple data types of media data, such as audio, visual, text data, video data, etc. Here, entire dataset 310 of media data is comprised solely of audio clips. In some embodiments, entire dataset 310 can be run through an unsupervised machine learning technique 312, which separates the media data into one or more clusters of data 320. Each cluster that the media data is separated into is based on some feature (or combination of features) that is present, determined, and/or extracted from the previous or current model. The feature can be based on any detectable feature in the media data, such as accent, gender, environmental background noise, etc. The feature can also be based on an accuracy range outside a threshold (e.g., datasets with audio data between 65-70% accuracy).

The media data of each cluster 320 can be sampled 322, where it is then analyzed for its accuracy and/or otherwise classified. The media data can be classified, for example, for multiple modalities, such as audio, video, face/object recognition, and text (NLP). Text labelling (NLP) and elements of (long form) audio can also be used, along with real-time media such as audio based wakewords, face recognition and short form audio (e.g., conversational AI). A subset dataset 330 can then be created that includes that portion of the sampled media data that most closely matches the feature(s) the cluster is created around. That subset dataset 330 is to be forwarded to a crowd source service to be verified.

Returning to FIG. 2, if the subset dataset of the media data is outside a threshold accuracy, the subset dataset is automatically forwarded to a crowd source service (step 230). The crowd source service can analyze the subset dataset, figure out how the current model failed, and verify a correct determination of the subset dataset. The system can then receive the verification of the subset dataset from the crowd source service (step 240). In some embodiments, the subset dataset is cleaned after verification, and then added to the first model (step 250).

Figure 4:
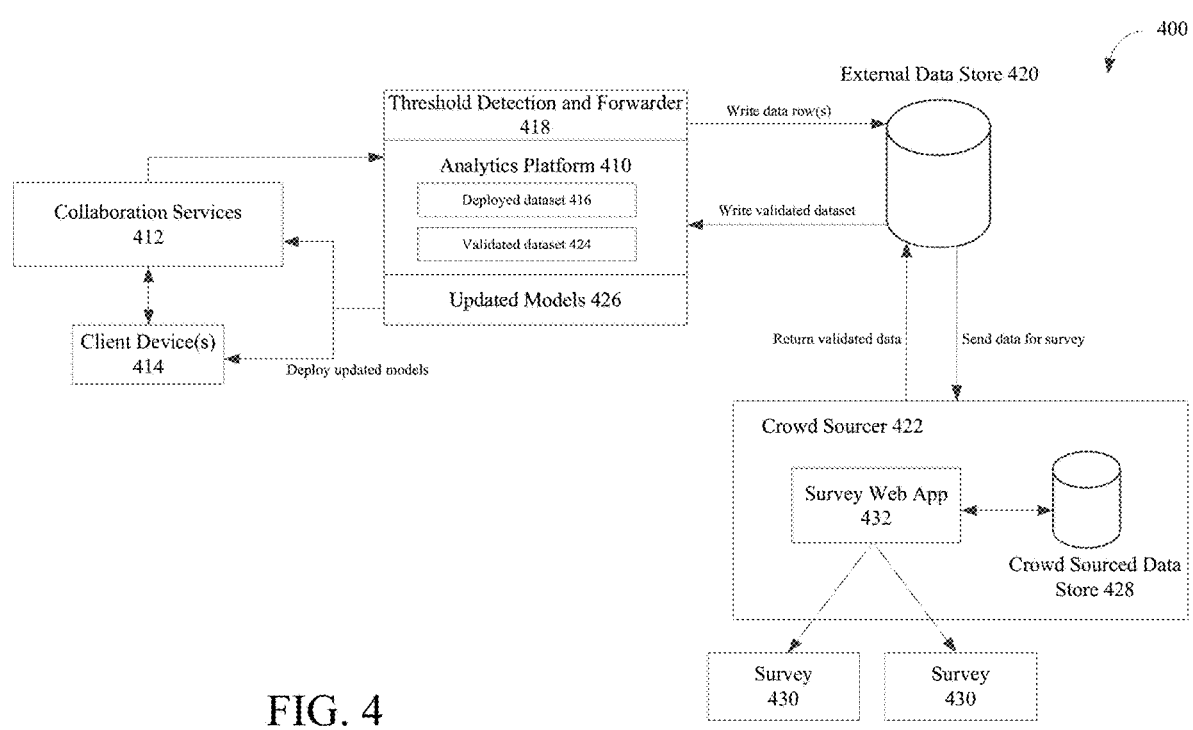
FIG. 4 shows an example training system in accordance with some aspects of the present technology.

FIG. 4 shows another example embodiment of a training system in accordance with some aspects of the present technology. System 400 shows a near real-time automated data pipeline system for improved accuracy using crowd sourcing in machine learning based cognitive collaboration. Analytics platform 410 can be a functional component that facilitates an automated data pipeline to both send media data for validation and to receive validated data back from crowdsourced vendors. In some embodiments, analytics platform 410 is used as a platform to build and test resulting, new models from the crowdsourced data.

During operation of collaboration services 412 via client device(s) 414, media data from client devices 414 can be received by analytics platform 410, which can be a data processing engine. Analytics platform 410 can analyze the media data with one or more deployed models, which uses deployed dataset 416 as the basis for its analysis. Some audio clips will be analyzed by the deployed models at high accuracies, e.g., 98% accuracy. Those audio clips will remain as part of deployed dataset 416, and will be used as normally in analytics platform 410 and/or collaboration services 412. However, some amount of media data will be uncertain. For example, one or more audio clips may be analyzed within some range of accuracies less than ideal, where the range of accuracies can be some configurable limit. For example, an audio clip may be analyzed as "Hi Spark!" with only a 65-75% accuracy. Uncertain data in this accuracy range, then, can be used in an automated process to re-train, modify, and/or correct the deployed models.

In some embodiments, media data can be analyzed according to one or more deployed models that can detect and/or extract features from the media data. For example, a metric (e.g., a feature metric) can be determined based on one or more features that fall out from an analysis of the current deployed models (although in some embodiments the feature metric can be set or predetermined by a user). Analytics platform 410 can cluster the media data based on the one or more feature metrics. As a result, an accuracy value can be assigned to the sampled media data for each cluster by measuring and/or determining how closely the metric measured in the sampled media data (e.g., the measured metric) matches the feature metric.

The clustered media data can be forwarded to threshold detection and forwarder service 418.

A subset dataset for each cluster can then be selected based on which of the sampled media data is representative of each cluster that most closely represents a centroid of the cluster. For example, the subset dataset can be made up of the media data that has a measured metric matching within a threshold the centroid defined by the feature metric.

System 400 can therefore be built on an automated data pipeline that forwards uncertain media data, or at least a subset dataset from the uncertain media data, to a crowd sourcer. Threshold detection and forwarder service 418, for example, can receive the subset dataset with accuracies outside the defined threshold and, once a specific number of subset datasets have been collected, can be forwarded to external data store 420. The forwarded subset datasets are written to external data store 420 as analytics platform 410 receives data from collaboration services 412.

Moreover, as the subset datasets are written to external data store 420, the subset datasets can then be automatically forwarded to crowd sourcer 422 based on the subset dataset of the media data being outside the threshold accuracy. Crowd sourcer 422 can validate the subset dataset by storing the subset dataset in crowd sourced data store 428 accessible to one or more surveys 430 through survey web application 432. Survey web application 432, for example, can ask surveys 430 to review the subset dataset, such as by asking surveys 430 to validate the analysis of the media data done by analytics platform 410. Survey web application 432 can ask surveys 430 to confirm audio file content (e.g., does the audio say "hey Spark"?) or supply audio content (e.g., what did you hear the audio saying?). In some embodiments, survey web application 432 can ask surveys 430 to confirm or identify background noise (e.g., did you hear knocking?).

After analytics platform 410 receives the verified subset dataset, the verified subset dataset can be cleaned and added to validated dataset 424. Updated models 426 can use validated dataset 424 to generate new models and/or retrain current models to increase accuracy.

For example, the addition of verified dataset 426 can generate a new model that can then be tested and compared to current or previous models. For example, crowd sourcer 422 can send labelled, validated data from the subset dataset, which after being added or appended to the previous model, creates a combined model dataset. The accuracy of the new model can be determined and, upon determining that the accuracy of the new model exceeds the previous model, the previous model can be updated or replaced by the new model. This can be done on an ongoing basis, creating a continuous pipeline of crowdsourcing data that continuously verifies and is used to update the current model.

The example below shows an example embodiment for how an ASR audio sample ID 12345, which has been marked outside the acceptable decision threshold, is written out from a virtual assistant, validated by a crowdsourced vendor and returned as verified data (e.g., new gold (ground source truth) data) to be used in an improved trained model. Once the gold data is returned, and after enough data volume is achieved, the model is retrained, tested, and compared to the previous model for accuracy. If the new model is more accurate, the new model is deployed to the service is question. In this case, the user said "join my meeting", but the ASR incorrectly transcribed "join my greeting," resulting in media data with an uncertainty below the threshold defined in the system. This is therefore sent for crowdsourced validation, which validated the correct transcription of "join my meeting."

Data Row: SampleID, Clip.wav, Predicted Transcription, Service Name: {12345, clip.wav, "join my greeting", spark_assistant_asr}

Validated data by crowdsourced agent: clip.wav audio=="join my meeting"

Return data: SampleID, Validated transcription: {12345, "join my meeting"}

Gold (ground source truth data) row:

SampleID, Clip.wav, Predicted Transcription, Validated Transcription, Service Name {12345, clip.wav, "join my greeting", "join my meeting", spark_assistant_asr}

The validated data can then be used to correct and update the previous model that incorrectly transcribed the media data, such that the ASR will correctly transcribe the media data as "join my meeting." This process with various tweaks and different parameters is repeatable for different modalities such as ASR, wakeword, face recognition, NLP, noise detection, object recognition etc.

Thus, some of the key system components are the automated threshold detection and forwarding of media data and metrics which require validation (which is currently a manual task carried out by a data scientist), and the creation of a near real-time data pipeline for data validation and creation of updated trained models (currently this is all offline processing and typically takes weeks or months per iteration). When used together in this system, automated rapid creation and deployment of improved (more accurate) models can be enabled.

In some embodiments, additionally and/or alternatively, the subset dataset can be automatically forwarded to the crowd source service based on a volume of the subset dataset being above a threshold accuracy. The volume of the subset dataset that initiates forwarding to the crowd source service can be based on a volume heuristics model that is configured to determine an amount of data predicted to successfully update the first model. For example, the creation of automated rule based testing and deployment of updated models can be based on the volume of incoming validated data. This introduces an automated solution based on acceptable data volume heuristics based on the amount of data predicted to successfully update a model. In some embodiments, these volume rules can be set and adjusted by a data scientist as required.

Figure 5:
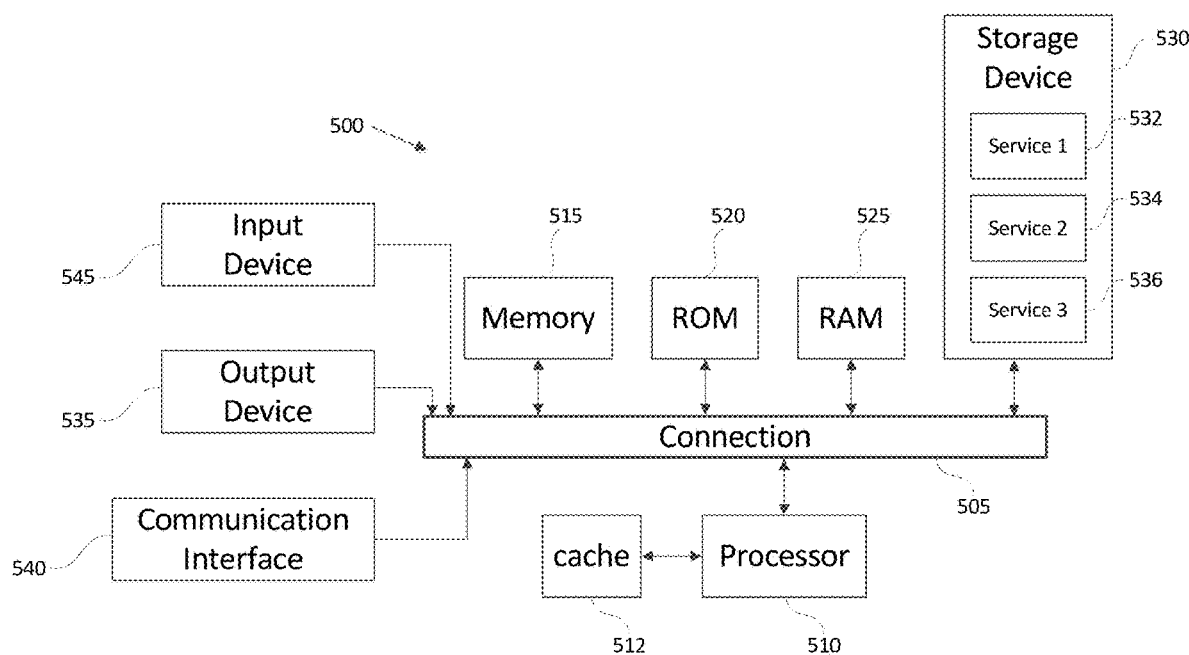
FIG. 5 shows an example of a system for implementing certain aspects of the present technology.

FIG. 5 shows an example of computing system 500 for use in components illustrated in FIGS. 1, 3, and 4, in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments computing system 500 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read only memory (ROM) and random access memory (RAM) to processor 510. Computing system 500 can include a cache of high-speed memory connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A near real-time data pipeline system for training a model comprising:
    at least one receiver for receiving a continuous pipeline of media data, wherein the media data includes at least crowd sourced data; and
    at least one processor and at least one memory containing instructions that, when executed, cause the at least one processor, in response to receiving the media data, to:
        separate the media data into one or more clusters, each cluster of the one or more clusters based on a feature from a first model;
        sample the media data of each cluster and, based on an analysis of the sampled media data, determine an accuracy of a subset dataset of the media data of each cluster, the accuracy associated with the feature;
        automatically detect, based on the accuracy of the subset dataset of the media data, that the subset dataset of the media data is outside of a threshold accuracy;
        in response to automatically detecting that the accuracy being outside of the threshold accuracy, automatically forward the subset dataset to a crowd source service;
        receive verification of the subset dataset from the crowd source service; and
        add the verified subset dataset to the first model.

2. The system of claim 1, the at least one processor further configured to:
    generate a second model based on the received verified subset dataset; and
    upon determining that an accuracy of the second model exceeds the first model, update the first model with the second model.

3. The system of claim 1, wherein the at least one processor that determines the accuracy of the subset dataset is configured to:
    determine a feature metric associated with the feature from an analysis of the first model;
    define a centroid based on the feature metric; and
    after separating the media data into the one or more clusters, determine a measured metric associated with the media data in each cluster.

4. The system of claim 3, wherein the at least one processor is further configured to:
    select the subset dataset of each cluster based on the measured metric matching the feature metric associated with the centroid within a threshold.

5. The system of claim 1, wherein the at least one processor is further configured to:
    receive a labelled subset dataset from the crowd source service;
    add the labelled subset dataset to the first model to create a combined model dataset;
    generate the second model based on the combined model dataset; and
    determine the accuracy of the second model.

6. The system of claim 1, wherein the at least one processor is configured to generate the second model on an ongoing basis.

7. The system of claim 1, wherein the at least one processor is configured to determine the feature from the first model based on at least one of an accent, gender, or environmental background noise in the media data.

8. The system of claim 1, wherein the media data is comprised of multiple data types, the multiple data types including audio, visual, and text data.

9. The system of claim 1, wherein the media data is configured to be separated into the one or more clusters based on an unsupervised machine learning technique.

10. The system of claim 1, wherein the at least one processor is further configured to automatically forward the subset dataset to the crowd source service based on a volume of the subset dataset being above the threshold accuracy.

11. The system of claim 10, wherein the volume of the subset dataset that initiates forwarding to the crowd source service is based on a volume heuristics model that is configured to determine an amount of data predicted to successfully update the first model.

12. A non-transitory computer-readable medium comprising instructions, when executed by a near real-time data pipeline system, the instructions cause the computing system to:
    receive a continuous pipeline of media data, wherein the media data includes at least crowd sourced data;
    in response to receiving the media data, separate media data into one or more clusters, each cluster of the one or more clusters based on a feature from a first model;
    sample the media data of each cluster and, based on an analysis of the sampled media data, determine an accuracy of a subset dataset of the media data of each cluster, the accuracy associated with the feature;
    automatically detect, based on the accuracy of the subset dataset of the media data, that the subset dataset of the media data is outside of a threshold accuracy; in response to automatically detecting that the accuracy being outside of the threshold accuracy, automatically forward the subset dataset to a crowd source service;
    receive verification of the subset dataset from the crowd source service; and add the verified subset dataset to the first model.

13. The non-transitory computer-readable medium of claim 12, the instructions further configured to:
    generate a second model based on the received verified subset dataset; and upon determining that an accuracy of the second model exceeds the first model, update the first model with the second model.

14. The non-transitory computer-readable medium of claim 12, wherein the instructions that determine the accuracy of the subset dataset are configured to:
determine a feature metric associated with the feature from an analysis of the first model;
define a centroid based on the feature metric;
after separating the media data into the one or more clusters, determine a measured metric associated with the media data in each cluster; and
select the subset dataset of each cluster based on the measured metric matching the feature metric associated with the centroid within a threshold.

15. The non-transitory computer-readable medium of claim 12, wherein automatically forwarding the subset dataset to the crowd source service is further based on a volume of the subset dataset being above the threshold accuracy.

16. A method of training a model by a near real-time data pipeline, the method comprising:
receiving a continuous pipeline of media data, wherein the media data includes at least crowd sourced data;
in response to receiving the media data, separating media data into one or more clusters, each cluster of the one or more clusters based on a feature from a first model;
sampling the media data of each cluster and, based on an analysis of the sampled media data, determining an accuracy of a subset dataset of the media data of each cluster, the accuracy associated with the feature;
automatically detecting, based on the accuracy of the subset dataset of the media data, that the subset dataset of the media data is outside of a threshold accuracy; in response to automatically detecting that the accuracy being outside of the threshold accuracy, automatically forwarding the subset dataset to a crowd source service;
receiving verification of the subset dataset from the crowd source service; and
adding the verified subset dataset to the first model.

17. The method of claim 16, further comprising:
generating a second model based on the received verified subset dataset; and
upon determining that an accuracy of the second model exceeds the first model, update the first model with the second model.

18. The method of claim 16, wherein determining the accuracy of the subset dataset comprises:
determining a feature metric associated with the feature from an analysis of the first model;
defining a centroid based on the feature metric;
after separating the media data into the one or more clusters, determining a measured metric associated with the media data in each cluster; and
selecting the subset dataset of each cluster based on the measured metric matching the feature metric associated with the centroid within a threshold.

19. The method of claim 16, wherein automatically forwarding the subset dataset to the crowd source service is further based on a volume of the subset dataset being above the threshold accuracy.

20. The method of claim 19, wherein the volume of the subset dataset that initiates forwarding to the crowd source service is based on a volume heuristics model that determines an amount of data predicted to successfully update the first model.

* * * * *